(12) United States Patent
Chang et al.

(10) Patent No.: US 6,188,531 B1
(45) Date of Patent: Feb. 13, 2001

(54) SYSTEM METHOD AND DEVICE FOR GENERATING A TEMPERATURE COMPENSATED WRITE CURRENT DURING DISK DRIVE WRITE OPERATIONS

(75) Inventors: James Lai Kein Chang; Myint Ngwe; Kah Liang Gan; Beng Wee Quak, all of Singapore (SG)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/070,271

(22) Filed: Apr. 30, 1998

Related U.S. Application Data

(60) Provisional application No. 60/058,236, filed on Sep. 8, 1997.

(51) Int. Cl.$^7$ ................................. G11B 5/09; G11B 5/03
(52) U.S. Cl. ................................. 360/46; 360/66
(58) Field of Search ................. 360/46, 66, 67; 323/316; 324/207.12, 211, 212; 327/538; 330/256, 266; 374/163, 172

(56) References Cited

U.S. PATENT DOCUMENTS

| | | | |
|---|---|---|---|
| 3,708,720 | * | 1/1973 | Whitney et al. ..................... 361/27 |
| 4,207,601 | * | 6/1980 | Desai et al. ..................... 360/78.05 |
| 5,337,012 | * | 8/1994 | Dijkmans ..................... 330/267 |
| 5,408,365 | * | 4/1995 | Van Doorn et al. ................. 360/46 |

\* cited by examiner

*Primary Examiner*—W. Chris Kim
*Assistant Examiner*—Regina Y. Neal
(74) *Attorney, Agent, or Firm*—Merchant & Gould P.C.

(57) ABSTRACT

A system, method, and device for sensing temperature during the writing of information onto magnetic media and providing a sufficient write current for that temperature is disclosed. The system comprises a head responsive to a write current for generating a magnetic flux used in writing data onto the magnetic media, a write current source coupled to the head for receiving a write signal and providing write current to the head, and a temperature responsive device coupled to the write current source that senses temperature and provides a write signal whose magnitude is dependent on temperature.

25 Claims, 4 Drawing Sheets

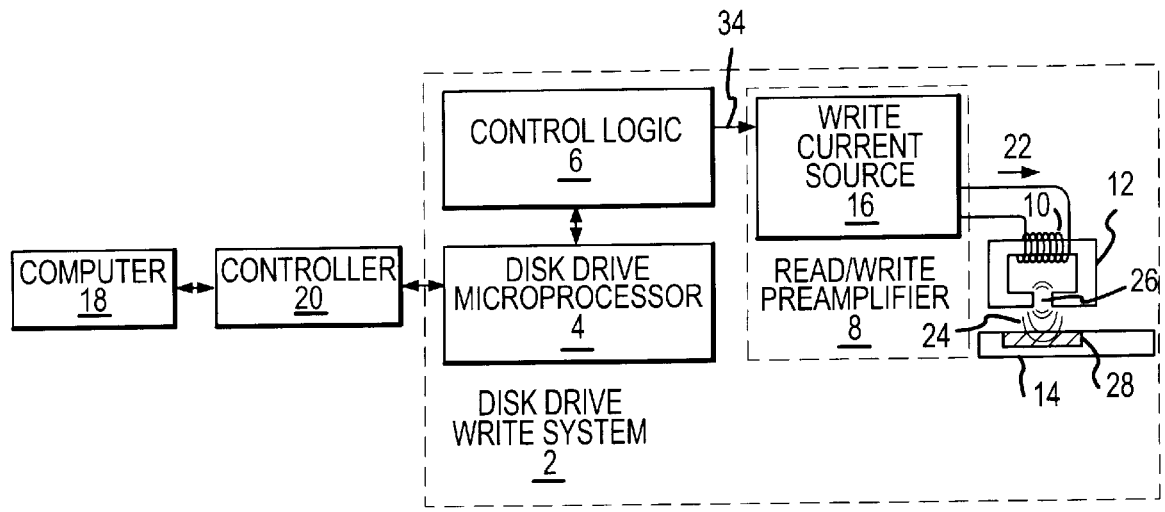
PRIOR ART
FIG.1
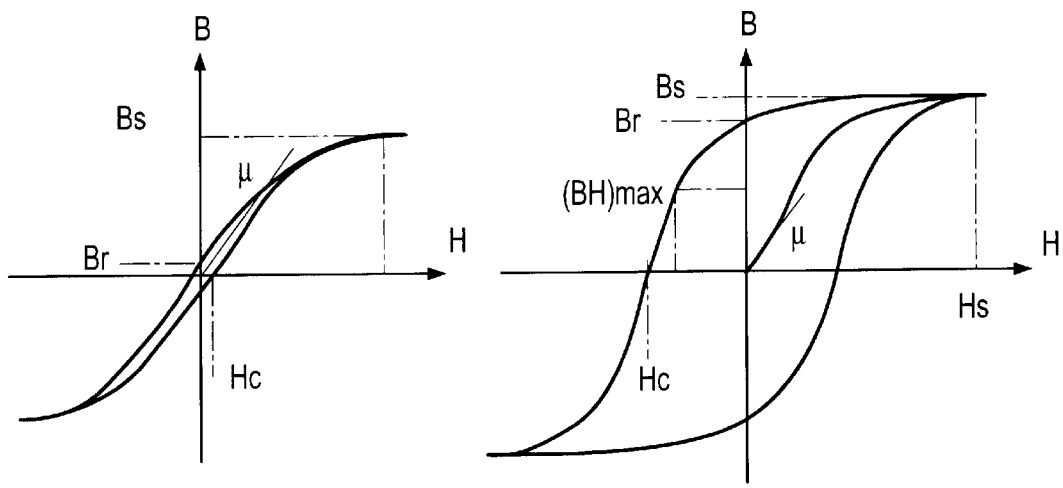
FIG.2a  FIG.2b

SYSTEM METHOD AND DEVICE FOR GENERATING A TEMPERATURE COMPENSATED WRITE CURRENT DURING DISK DRIVE WRITE OPERATIONS

CROSS-REFERENCE TO RELATED APPLICATIONS

Embodiments of this invention relate to Provisional Application Ser. No. 60/058,236, filed Sep, 8, 1997. The contents of that application are incorporated by reference herein.

BACKGROUND OF THE INVENTION

1. Field of the Invention

Embodiments of this invention relate generally to disk drives of the type generally used for storing digital data, and in particular to methods and devices for applying a temperature-compensated write current to read/write heads during disk drive write operations, and disk drive systems incorporating the same.

2. Description of Related Art

Modern computers require media in which digital data can be quickly stored and retrieved. Magnetizable (hard) layers on disks have proven to be a reliable media for fast and accurate data storage and retrieval. Disk drives that read data from and write data to hard disks have thus become popular components of computer systems.

FIG. 1 illustrates a conventional disk drive write system 2 comprising a disk drive microprocessor 4, control logic 6, read/write preamplifier 8, coil 10, read/write core 12, and hard disk 14. The read/write preamplifier 8 further includes a write current source 16. During write operations, a computer 18 communicates through controller 20 with the disk drive microprocessor 4. In response to commands from the controller 20, the disk drive microprocessor 4, by means of control logic 6, provides a write signal 34 to the read/write preamplifier 8. The read/write preamplifier 8 energizes the write current source 16, which applies a write current 22 through coil 10, inducing magnetic flux 24 to form within the read/write core 12 and fringe across a core gap 26. The strength of the fringing magnetic flux 24 varies directly with the amount of write current 22 flowing through the coil 10. The fringing magnetic flux 24 passes through magnetizable material 28 within the hard disk 14 located beneath the core gap 26, causing that material to become magnetized and oriented in the direction of the magnetic flux 24. As the hard disk 14 spins and the read/write core 12 passes over other magnetizable material during the course of a write operation, the direction of the write current 22 may be reversed, causing the fringing magnetic flux 24 to be oppositely oriented and reversing the polarity of the magnetizable material 28. As the fringing magnetic flux 24 goes through a series of such reversals, a data pattern is formed within the hard disk 14 from the polarity sequence of the magnetizable material 28.

In disk drive systems, the magnetizable material within the disk is "hard," meaning that once the magnetizable material has been polarized and a data pattern established as described above, the polarity of the magnetized material and hence the data pattern will remain intact until a magnetic flux of sufficient magnitude reverses the polarity and changes the pattern. The measure of a magnetized material's hardness or ability to resist magnetic change is coercivity, $H_c$, and a magnetized material's coercivity once a magnetizing flux has been removed is known as its residual or remnant coercivity, $H_{cr}$. Another property of importance to consider is a magnetized material's intensity of magnetization, M, and its residual or remnant intensity of magnetization once a magnetizing flux has been removed, $M_r$. Higher values of $H_{cr}$ and $M_r$ mean that a higher reverse-polarity magnetic flux is required to reverse the polarity of the magnetized material.

SUMMARY OF THE DISCLOSURE

Therefore, it is an object of embodiments of the invention to provide a system, method, or device for sensing temperature during the writing of information onto a hard disk and providing a sufficient write current for that temperature.

It is a further object of preferred embodiments of the invention to provide a system, method, or device for automatically sensing temperature during the writing of information onto a hard disk and automatically providing a sufficient write current for that temperature.

It is a further object of preferred embodiments of the invention to provide a system, method, or device for automatically sensing temperature during the writing of information onto a hard disk and automatically providing a sufficient write current for that temperature that can be easily manufactured at a low cost.

These and other objects are accomplished according to a system for sensing temperature during the writing of information onto a hard disk and providing a sufficient write current for that temperature, wherein the system is comprised of a head responsive to a write current for generating a magnetic flux used in writing data onto a hard disk, a write current source coupled to the head for receiving a write signal and providing write current to the head, and a temperature sensing device coupled to the write current source that senses temperature and provides the write signal whose magnitude is dependent on temperature.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 1 is a block diagram of a conventional disk drive write system.

FIG. 2a illustrates the relationship of H, $H_c$, and B for soft magnetic material.

FIG. 2b illustrates the relationship of H, $H_c$, and B for hard magnetic material.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Modern computers require a media in which digital data can be quickly stored and retrieved. Magnetizable (hard) disks have proven to be a reliable media for fast and accurate data storage and retrieval. Disk drives that store and retrieve data from hard disks have thus become popular components of computer systems. While embodiments of the invention can be used with magnetizable media other than hard disks (e.g. floppy disks, tapes, and cylinders), preferred embodiments are described herein primarily with respect to hard disk embodiments for purposes of simplifying the disclosure.

In disk drive recording, data is stored in the form of oriented magnetic fields on a disk containing magnetizable (hard) material. During a write sequence, a disk drive microprocessor encodes data received from a host computer and directs control logic and a read/write preamplifier to apply a write current to a write core constructed to form a gap. The high reluctance ($\mathfrak{R}$) of the gap causes the flux appearing across the gap to fringe and magnetize the magnetic material within the hard disk. The polarity of the write current determines the direction of the magnetic flux across the gap and thus the polarity of the flux reversals in the magnetic material. Changes in the write current direction cause corresponding changes in the magnetic polarity of the magnetic material, and thus a data pattern is recorded from a series of such flux reversals.

Figure 2C:
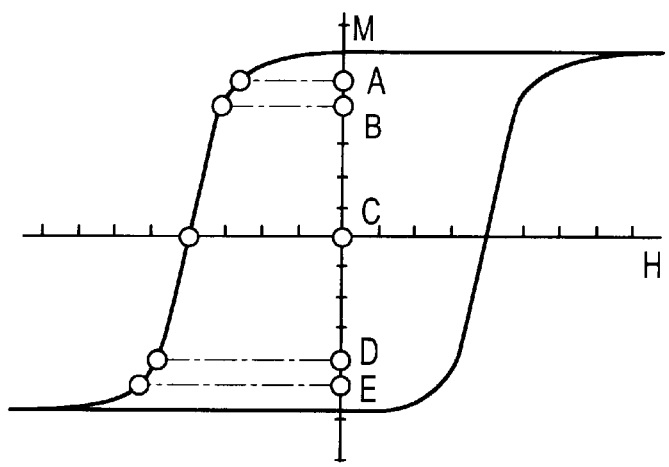
FIG. 2c illustrates the positions of the magnetized poles in magnetizable media before and after overwriting.

The magnetic material within a disk is made of hard material. This means that once data has been recorded, the magnetic pattern on the material will remain intact until new information is recorded over it. This measure of hardness or ability to resist magnetic change is termed coercivity, $H_c$. Another property of importance to consider in the choice of magnetic material is its magnetic flux density B, where $B = \mu_0 H + 2\pi M$, $\mu_0$ is the permeability of free space, H is the magnetic field intensity and M is the intensity of magnetization of the material. Magnetic material should possess a high residual or remnant flux density $B_r$, meaning that the flux density remaining after the magnetizing flux has been removed is still high. FIG. 2a illustrates the relationship of H, $H_c$, and B for soft magnetic material and FIG. 2b illustrates the relationship of H, $H_c$, and B for hard magnetic material, where $B_s$, is the saturation flux density, $H_s$, is the saturation magnetizing flux, $(BH)_{max}$ is the maximum product energy, $\mu$ is the permeability, and Oe is the unit oersted. FIG. 2c illustrates the positions of the magnetized poles in magnetizable media before and after overwriting, where A and B are the initial positions of the magnetic poles in the media, C is the position of magnetic null after applying an oppositely oriented magnetic field of strength $H_c$, and D and E are the new positions of the magnetic poles in the media after application of an oppositely oriented magnetic field of a strength of twice $H_c$.

Figure 3:
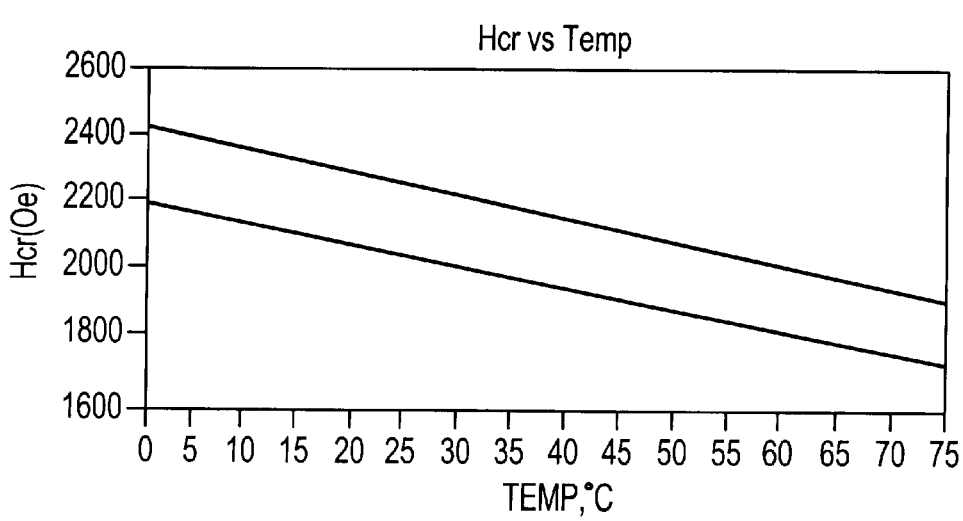
FIG. 3 illustrates the relationship of the residual or remnant coercivity $H_{cr}$ and temperature.

$H_c$ varies inversely with temperature. As the temperature decreases, $H_c$ of the magnetizable material increases, and therefore a higher magnetic field strength is needed in the write core gap to overwrite the disk and change its data patterns, or reduce $B_r$ to zero. FIG. 3 illustrates the relationship of the residual or remnant coercivity $H_{cr}$ and temperature. Table A below represents soft magnetic material and corresponds to the lower line in FIG. 3, while Table B below represents hard magnetic material and corresponds to the upper line in FIG. 3.

TABLE A

| $H_{cr} = -5.8594T + 2187.9$ | | | |
| $M_{rt} = -0.0007T + 1.48$ | | | |
| Temp (T) | $H_{cr}$ | $M_{rt}$ | S |
| --- | --- | --- | --- |
| 25 | 2034 | 1.45 | 0.960 |
| 50 | 1893 | 1.46 | 0.938 |
| 75 | 1756 | 1.45 | 0.954 |
| 100 | 1613 | 1.38 | 0.936 |
| 125 | 1455 | 1.40 | 0.947 |
| 150 | 1300 | 1.38 | 0.941 |

TABLE B

| $H_{cr} = -6.392T + 2415.5$ | | | |
| $M_{rt} = -0.002T + 1.352$ | | | |
| Temp (T) | $H_{cr}$ | $M_{rt}$ | S |
| --- | --- | --- | --- |
| 25 | 2253 | 1.34 | 0.9408 |
| 50 | 2099 | 1.33 | 0.9273 |
| 75 | 1936 | 1.37 | 0.9399 |
| 100 | 1775 | 1.33 | 0.9306 |
| 125 | 1620 | 1.32 | 0.9178 |
| 150 | 1454 | 1.32 | 0.9319 |

In addition, a higher $H_c$ implies a higher write current is needed to change data patterns at cold temperature. Write currents sufficient to change the polarity of magnetized material on a hard disk at room temperature may therefore be insufficient at colder temperatures. If no adjustment to the write current is made at cold temperatures, data writing errors may occur.

Figure 4:
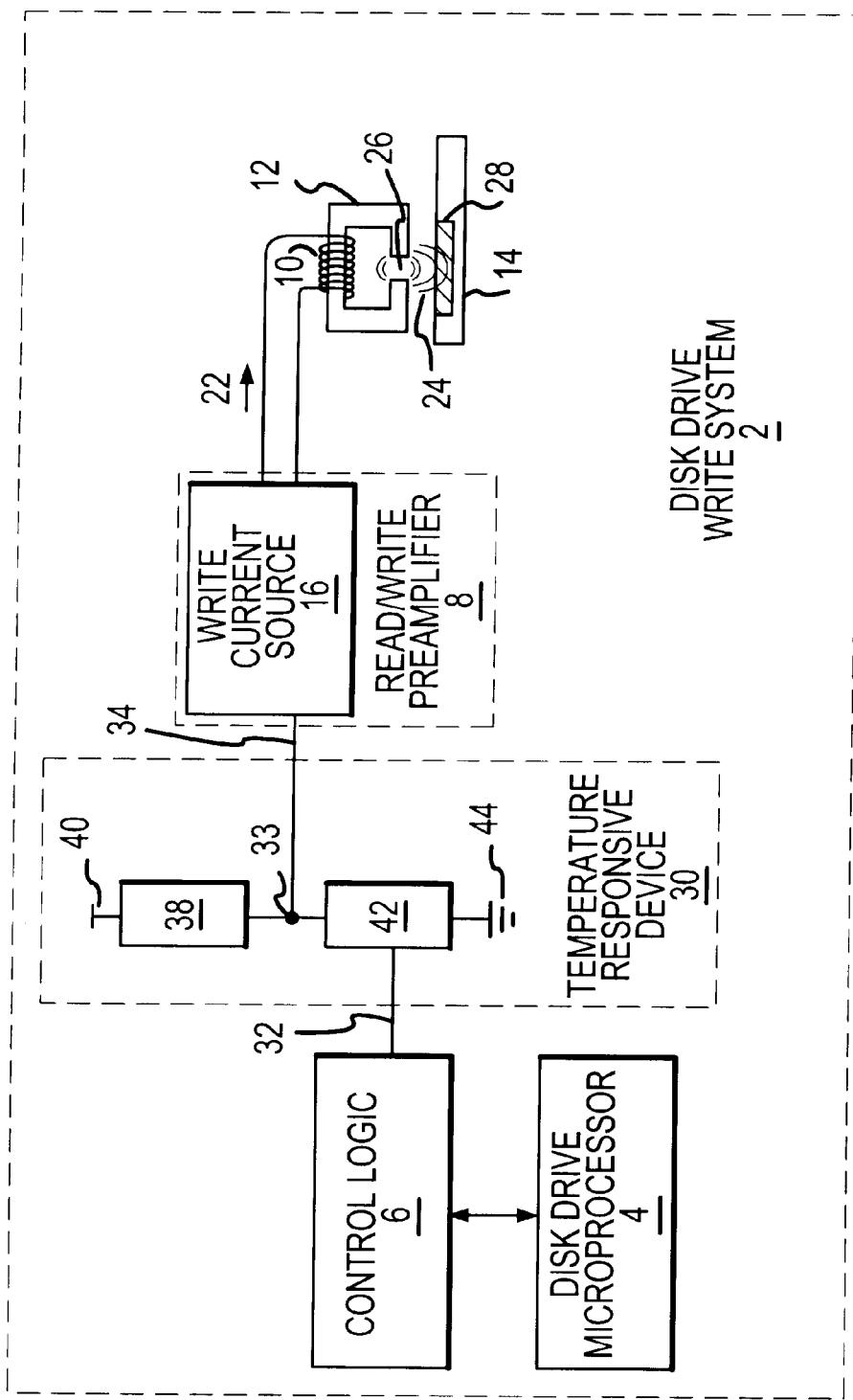
FIG. 4 is a block diagram of a disk drive write system according to an embodiment of the invention which automatically senses temperature during the writing of information onto a hard disk and provides a sufficient write current for that temperature.

A disk drive write system 2 that senses temperature during the writing of information onto a hard disk and provides a sufficient write current for that temperature according to an embodiment of the present invention is shown in FIG. 4. Referring to FIG. 4, the disk drive write system 2 comprises a disk drive microprocessor 4, control logic 6, temperature responsive device 30, read/write preamplifier 8, coil 10, read/write core 12, and hard disk 14.

The disk drive microprocessor 4 is coupled to the control logic 6 and sends signals to, or receives signals from, the control logic 6. The control logic 6 is coupled to and sends a plurality of coarse write current control signals 32 to the temperature responsive device 30. The temperature responsive device 30 generates a write signal 34 from an output node 33. In one embodiment, the temperature responsive device 30 comprises a first variable resistance device 38 coupled between a first reference voltage 40 and the output node 33, and a second variable resistance device 42 coupled between the output node 33 and a second reference voltage 44. The read/write preamplifier 8 comprises a write current source 16 that receives the write signal 34 from the temperature responsive device 30 and generates a write current 22 through the coil 10. In alternative embodiments, the first variable resistance device 38, although part of the temperature responsive device 30, may be physically located within the read/write preamplifier 8.

During write operations, firmware in the disk drive microprocessor 4 determines the amount of write current 22 needed, and commands control logic 6 to configure the second variable resistance device 42 to provide a certain equivalent resistance $R_{42}$ for coarse adjustment of the write signal 34. $R_{42}$ establishes a certain collector current in the mirror transistor (not shown in FIG. 4) of a current mirror circuit (not shown in FIG. 4) located within the read/write preamplifier 8, which in turn controls the collector current (write current 22) of mirror source transistors (not shown in FIG. 4) located within the current mirror circuit. Concurrently, the first variable resistance device 38 automatically provides a resistance $R_{38}$ that varies inversely with temperature for fine adjustment of the write signal 34. In preferred embodiments of the present invention, the first variable resistance device 38 comprises a Murata thermistor, Part No. NTH5G2M36M153. However, other suitable thermistor devices may be used in further embodiments. Together, the first variable resistance device 38 and the second variable resistance device 42 form a voltage divider that generates a write signal 34 whose voltage varies directly with temperature.

This write signal 34 is coupled to the write current source 16, which provides a write current 22 to the coil 10 that varies inversely with temperature according to the formula $I_{22}=K*R_{38}/R_{42}+C$, where $I_{22}$ is the write current 22, C is an offset constant, and K is a constant based on a band-gap reference voltage provided by the read/write preamplifier 8. The write current 22 induces a magnetic flux 24 to form within the read/write core 12 and fringe across the core gap 26, which passes through and magnetizes the magnetizable material 28 within the hard disk 14 located beneath the core gap 26. Because the magnitude of the fringing magnetic flux 24 and hence the overwriting capability of the read/write core 12 varies directly with the amount of write current 22 flowing through the coil 10, the resistance range of the first variable resistance device 38 is selected and the second variable resistance device 42 is configured to produce a temperature-compensated write current 22 sufficient to overwrite data over the expected temperature range.

Those skilled in the art will recognize that the disk drive write system 2 of FIG. 4 is not intended to limit embodiments of the present invention. Indeed, those skilled in the art will recognize that alternative hardware configurations may be used without departing from the scope of the present invention.

Figure 5:
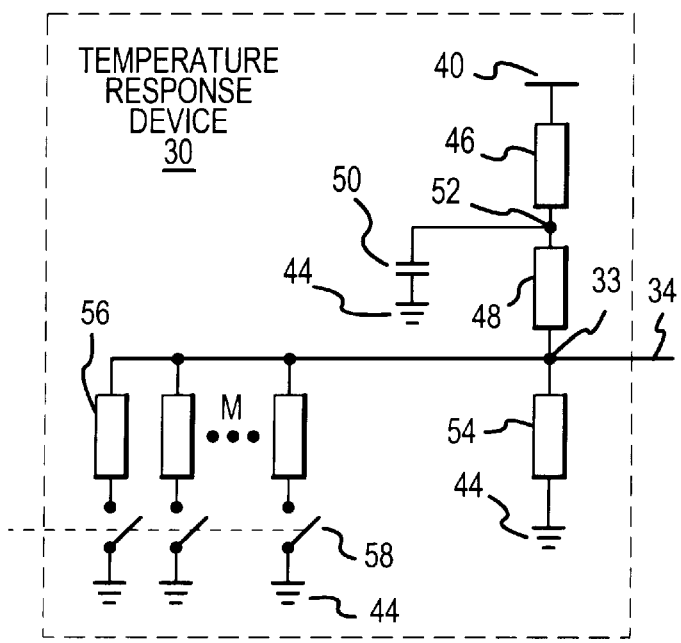
FIG. 5 is a block diagram of a temperature responsive device for use with the system of FIG. 4 according to an embodiment of the invention that generates a temperature-compensated write signal whose voltage varies directly with temperature.

In an embodiment of a temperature responsive device 30 shown in FIG. 5 for automatically sensing the temperature and providing a write signal 34 whose voltage varies directly with temperature, the first variable resistance device 38 of FIG. 4 has been replaced by a thermistor 46, first resistive device 48, and a capacitive device 50. The thermistor 46 is coupled between a first reference voltage 40 and a decoupling node 52. The capacitive device 50 suppresses voltage ripple on the first reference voltage 40, and is coupled between the decoupling node 52 and a second reference voltage 44. The first resistive device 48 is coupled between decoupling node 52 and output node 33. In addition, the second variable resistance device 42 of FIG. 4 has been replaced in FIG. 5 by a second resistive device 54, a plurality of parallel resistive devices 56, and a plurality of switches 58. The second resistive device 54 is coupled between the output node 33 and the second reference voltage 44. The plurality of parallel resistive devices 56 are individually coupled between the write signal 34 and a corresponding switch 58 coupled to the second reference voltage 44.

During write operations the disk drive microprocessor (not shown in FIG. 5) commands control logic (not shown in FIG. 5) to configure the plurality of switches 58 to couple one or more parallel resistive devices 56 between the output node 33 and the second reference voltage 44, thereby providing a certain equivalent resistance $R_{EQ}$ for coarse adjustment of the write signal 34 according to the generalized equation $$1/R_{EQ}=1/R_{54}+(1/R_1+1/R_2+\ldots 1/R_M),$$

where $R_{54}$ is the resistance across the second resistive device 54, M is the number of parallel resistive devices 56 that exist in the temperature sensitive device 30, and $R_1, R_2 \ldots R_M$ are the individual resistances of those M parallel resistive devices 56. Note, however, that the $R_1, R_2 \ldots R_M$ terms only appear in the equation if those particular parallel resistive devices are coupled between the write signal 34 and the second reference voltage 44 due to the closing of corresponding switches 58. $R_{EQ}$ establishes a certain collector current in the mirror transistor (not shown in FIG. 5) of a current mirror circuit (not shown in FIG. 5) located within the read/write preamplifier 8, which in turn controls the collector current (write current 22) of mirror source transistors (not shown in FIG. 5) located within the current mirror circuit.

Concurrently, the thermistor 46 automatically provides a resistance $R_{46}$ that varies inversely with temperature for fine adjustment of the write signal 34. The thermistor 46, first resistive device 48, and $R_{EQ}$ form a voltage divider that provides a write signal 34 whose voltage varies directly with temperature. The write signal 34 causes the write current source (not shown in FIG. 5) to provide a write current (not shown in FIG. 5) that varies inversely with temperature according to the formula $I_{22}=K*(R_{46}+R_{48})/R_{EQ}+C$, where $I_{22}$ is the write current 22, C is an offset constant, K is a constant based on a band-gap reference voltage provided by the read/write preamplifier 8, and $R_{48}$ is the resistance across first resistive device 48. Because overwriting capability varies directly with the amount of write current 22, the thermistor 46, first resistive device 48, second resistive device 54, and parallel resistive devices 56 are selected, and switches 58 configured, to produce a write current 22 sufficient to overwrite data at a given temperature.

Figure 6:
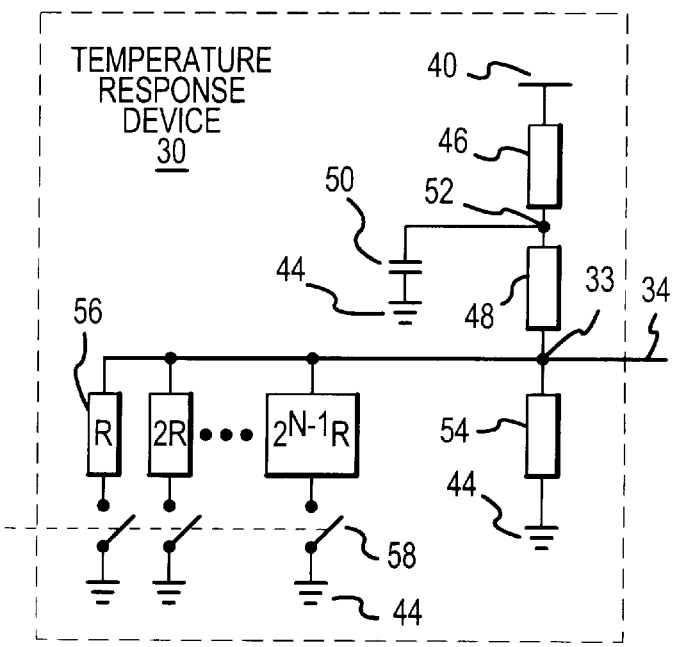
FIG. 6 is a block diagram of a temperature responsive device for use with the system of FIG. 4 in accordance with a further embodiment of the invention that generates a temperature-compensated write signal whose voltage varies directly with temperature.

In a preferred embodiment of a temperature responsive device 30 shown in FIG. 6 for automatically sensing the temperature and providing a write signal 34 whose voltage varies directly with temperature, the plurality of parallel resistive devices 56 are assigned resistance values of R,2*R, 4*R, 8*R, etc., such that the Nth parallel resistive device 56 has a resistance of $2^{N-1}*R$, where R is the resistance of the first parallel resistive device 56. These resistance relationships between the plurality of parallel resistive devices 56 enable coarse adjustment of the write current (not shown in FIG. 6) to be made with finer granularity while utilizing a minimum of parallel resistive devices 56. In all other respects the discussion of FIG. 5 is applicable.

Use of embodiments of the present invention will result in less data writing errors and reduction of the bit error rate (BER), as the analog control provided by thermistor 46 allows finer adjustment and optimization of the write signal 34 than is possible with the discrete adjustments of the parallel resistive devices 56 alone. In addition, the utilization of simple, low-cost, passive components such as resistors, thermistors, and capacitors in embodiments of the present invention will result in a low cost, easily manufacturable device.

The foregoing description of preferred embodiments of the invention has been presented for the purposes of illustration and description. It is not intended to be exhaustive or to limit the invention to the precise form disclosed. Many modifications and variations are possible in light of the above teaching. For example, although the preceding discussion focuses on hard disk drives, those skilled in the art will recognize that embodiments of the invention may be utilized in other applications where write heads use magnetic flux to store information on magnetic media, such as floppy disks, tapes, and cylinders. It is intended that the scope of the invention be limited not by this detailed description, but rather by the claims appended hereto.

What is claimed:

1. A system for sensing temperature during writing of information onto magnetic media and providing a sufficient write current for the sensed temperature, the system comprising:

a head responsive to a write current for generating a magnetic flux used in writing data onto magnetic media;

a write current source coupled to the head for receiving a write signal and providing write current to the head, wherein the magnitude of the write current is controlled by the write signal; and a temperature responsive device coupled to the write current source that senses temperature and provides a write signal having a magnitude dependent on temperature, the temperature responsive device comprising:

a first variable resistance device coupled between a first reference voltage and an output node for fine adjustment of the write signal, wherein the output node is coupled to the write current source and communicates the write signal to the write current source;

a second variable resistance device coupled between the output node and a second reference voltage for coarse adjustment of the write signal; and a coarse adjust input coupled to the second variable resistance device for adjusting the resistance of the second variable resistance device.

2. The system of claim 1, wherein the first variable resistance device comprises:

a thermistor coupled between the first reference voltage and a decoupling node for fine adjustment of the write signal;

a first resistive device coupled between the decoupling node and the output node for proper biasing of the write signal; and a capacitive device coupled between the decoupling node and the second reference voltage for suppressing voltage ripple on the first reference voltage.

3. The system of claim 1, wherein the second variable resistance device comprises:

a second resistive device coupled between the output node and the second reference voltage, wherein the second resistive device functions as a pulldown resistor for biasing the write signal closer to the second reference voltage;

a plurality of parallel resistive devices having a first and second end, each parallel resistive device having its first end coupled to the output node for further biasing the write signal closer to the second reference voltage; and a plurality of switches, each coupled between the second end of one parallel resistive device and the second reference voltage for shunting the parallel resistive device to the second reference voltage and making coarse adjustments to the write signal;

wherein the coarse adjust input may selectively close or open the switches for coarse adjustment of the write signal.

4. The system of claim 3, wherein the plurality of parallel resistive devices comprises an ordered succession of M parallel resistive devices for enabling finer granularity in the coarse adjustment of the write signal, each parallel resistive device in the ordered succession being individually identified as either a first, second, third, or Nth parallel resistive device, where N=4 to M, and wherein the resistance of the first parallel resistive device is R, the resistance of the second parallel resistive device is 2*R, the resistance of the third parallel resistive device is 4*R, and the resistance of the Nth parallel resistive device is $2^{N-1}*R$.

5. The system of claim 1, wherein the first variable resistance device comprises:

a thermistor coupled between the first reference voltage and a decoupling node for fine adjustment of the write signal;

a first resistive device couples between the decoupling node and the output node for proper biasing of the write signal; and a capacitive device coupled between the decoupling node and the second reference voltage for suppressing voltage ripple on the first reference voltage.

6. The device of claim 5, wherein the thermistor comprises a 10 kOhm thermistor.

7. The device of claim 5, wherein the first resistive device comprises a 10 kOhm resistor.

8. The device of claim 5, wherein the capacitive device comprises a 0.1 uF capacitor.

9. The device of claim 5, wherein the second variable resistance device comprises:

a second resistive device coupled between the output node and the second reference voltage, wherein the second resistive device functions as a pulldown resistor for biasing the write signal closer to the second reference voltage;

a plurality of parallel resistive devices having a first and second end, each parallel resistive device having its first end coupled to the output node for further biasing the write signal closer to the second reference voltage; and a plurality of switches, each coupled between the second end of one parallel resistive device and the second reference voltage for shunting the parallel resistive device to the second reference voltage and making coarse adjustments to the write signal;

wherein the coarse adjust input may selectively close or open the switches for coarse adjustment of the write signal.

10. The device of claim 9, wherein the second resistive device comprises a 6.5 kOhm resistor.

11. The device of claim 9, wherein the plurality of parallel resistive devices comprises an ordered succession of M parallel resistive devices for enabling finer granularity in the coarse adjustment of the write signal, each parallel resistive device in the ordered succession being individually identified as either a first, second, third, or Nth parallel resistive device, where N=4 to M, and wherein the resistance of the first parallel resistive device is R, the resistance of the second parallel resistive device is 2*R, the resistance of the third parallel resistive device is 4*R, and the resistance of the Nth parallel resistive device is $2^{N-1}*R$.

12. A method of sensing temperature during the writing of information onto magnetic media and generating a write current and a magnetic field in the vicinity of the magnetic media sufficient to write information onto the magnetic media at that temperature, the method comprising:

automatically sensing temperature using a first variable resistance device coupled between a first reference voltage and an output node for fine adjustment of a write signal;

sending a control signal to a second variable resistance device coupled between the output node and a second reference voltage to configure the second variable resistive device for coarse adjustment of the write signal;

producing a write current dependent on the magnitude of the write signal; and inducing a magnetic flux responsive to the write current in a head positioned in the vicinity of the magnetic media.

13. The method of claim 12, wherein the step of producing a write current further comprises the steps of:

dividing down the first reference voltage with a voltage divider formed by coupling the first variable resistance device and the second variable resistance device together at the output node;

wherein the output node communicates the write signal.

14. The method of claim 13, wherein the step of sending a control signal further comprises the step of:

sending a plurality of control signals to open or close one or more switches within the second variable resistance device to shunt one or more parallel resistive devices to the second reference voltage.

15. The method of claim 14, wherein the step of sending a plurality of control signals to open or close one or more switches within the second variable resistance device to shunt one or more parallel resistive devices to the second reference voltage comprises the steps of:

selecting an ordered succession of M parallel resistive devices, each parallel resistive device being individually identified as either a first, second, third, or Nth parallel resistive device, where N=4 to M;

selecting the resistance of the first parallel resistive device to be R, the resistance of the second parallel resistive device to be 2*R, the resistance of the third parallel resistive device to be 4*R, and the resistance of the Nth parallel resistive device to be $2^{N-1}*R$;

coupling each of the M parallel resistive devices to the second reference voltage with a controllable switch; and commanding a plurality of control signals to open or close one or more of the controllable switches to shunt the corresponding parallel resistive device to the second reference voltage.

16. The method of claim 12, wherein the step of automatically sensing temperature using a first variable resistance device coupled between a first reference voltage and an output node further comprises the step of:

generating a resistance varying inversely with temperature by utilizing a thermistor.

17. The method of claim 12, wherein the step of inducing a magnetic flux responsive to the write current in a head positioned in the vicinity of the magnetic media further comprises the steps of:

communicating the write current through a coil wrapped about a read/write core; and inducing a magnetic flux in the read/write core whose strength varies directly with the magnitude of the write current.

18. A temperature responsive device for providing a temperature-compensated write signal during the writing of information to magnetic media, the temperature responsive device comprising:

a first variable resistance device coupled between a first reference voltage and an output node for fine adjustment of the write signal, wherein the output node is coupled to the write signal;

a second variable resistance device coupled between the output node and a second reference voltage for coarse adjustment of the write signal; and a coarse adjust input coupled to the second variable resistance device for adjusting the resistance of the second variable resistance device.

19. The device of claim 18, wherein the first variable resistance device comprises:

a thermistor coupled between the first reference voltage and a decoupling node for fine adjustment of the write signal;

a first resistive device coupled between the decoupling node and the output node for proper biasing of the write signal; and a capacitive device coupled between the decoupling node and the second reference voltage for suppressing voltage ripple on the first reference voltage.

20. The device of claim 18, wherein the thermistor comprises a 10 kOhm thermistor.

21. The device of claim 18, wherein the first resistive device comprises a 10 kOhm resistor.

22. The device of claim 18, wherein the capacitive device comprises a 0.1 uF capacitor.

23. The device of claim 18, wherein the second variable resistance device comprises:

a second resistive device coupled between the output node and the second reference voltage, wherein the second resistive device functions as a pulldown resistor for biasing the write signal closer to the second reference voltage;

a plurality of parallel resistive devices having a first and second end, each parallel resistive device having its first end coupled to the output node for further biasing the write signal closer to the second reference voltage; and a plurality of switches, each coupled between the second end of one parallel resistive device and the second reference voltage for shunting the parallel resistive device to the second reference voltage and making coarse adjustments to the write signal;

wherein the coarse adjust input may selectively close or open the switches for coarse adjustment of the write signal.

24. The device of claim 23, wherein the second resistive device comprises a 6.5 kOhm resistor.

25. The device of claim 23, wherein the plurality of parallel resistive devices comprises an ordered succession of M parallel resistive devices for enabling finer granularity in the coarse adjustment of the write signal, each parallel resistive device in the ordered succession being individually identified as either a first, second, third, or Nth parallel resistive device, where N=4 to M, and wherein the resistance of the first parallel resistive device is R, the resistance of the second parallel resistive device is 2*R, the resistance of the third parallel resistive device is 4*R, and the resistance of the Nth parallel resistive device is $2^{N-1}*R$.

\* \* \* \* \*